United States Patent
Hans et al.

(10) Patent No.: US 8,411,652 B2
(45) Date of Patent: Apr. 2, 2013

(54) METHOD OF OPERATING A MOBILE RADIO NETWORK

(75) Inventors: Martin Hans, Hildesheim (DE); Mark Beckmann, Braunschweig (DE)

(73) Assignee: IPCOM GmbH & Co. KG, Pullach (DE)

( * ) Notice: Subject to any disclaimer, the term of this patent is extended or adjusted under 35 U.S.C. 154(b) by 206 days.

(21) Appl. No.: 12/272,249

(22) Filed: Nov. 17, 2008

(65) Prior Publication Data

US 2009/0073872 A1 Mar. 19, 2009

Related U.S. Application Data

(63) Continuation of application No. 10/204,114, filed as application No. PCT/DE01/00536 on Feb. 13, 2001, now Pat. No. 7,466,708.

(30) Foreign Application Priority Data

Feb. 22, 2000 (DE) .................................. 100 08 148

(51) Int. Cl.
H04W 4/00 (2009.01)
(52) U.S. Cl. ........................ 370/338; 370/394; 370/469
(58) Field of Classification Search .................. 370/338, 370/394, 469
See application file for complete search history.

(56) References Cited

U.S. PATENT DOCUMENTS

| | | | | |
|---|---|---|---|---|
| 5,251,214 A | * | 10/1993 | Mertens et al. | 370/475 |
| 5,444,696 A | * | 8/1995 | Petranovich | 370/337 |
| 5,446,733 A | * | 8/1995 | Tsuruoka | 370/232 |
| 5,588,009 A | * | 12/1996 | Will | 714/749 |
| 6,424,625 B1 | | 7/2002 | Larsson et al. | |
| 6,519,223 B1 | * | 2/2003 | Wager et al. | 370/216 |
| 6,721,707 B1 | * | 4/2004 | Chu et al. | 704/500 |
| 6,857,095 B2 | * | 2/2005 | Suumaki et al. | 714/748 |
| 2001/0005371 A1 | | 6/2001 | Sera | |
| 2001/0017850 A1 | | 8/2001 | Kalliokulju et al. | |
| 2003/0002507 A1 | | 1/2003 | Hans et al. | |

FOREIGN PATENT DOCUMENTS

| | | |
|---|---|---|
| DE | 501 05 905.9 | 4/2005 |
| WO | WO 98/58469 | 12/1998 |

OTHER PUBLICATIONS

ETSI: "Universal Mobile Telecommunication System (UMTS); Radio Link Control (RLC) Protocol Specification", (3G TS 25.322, version 3.1.2, Release 1999), ETSI TS 125.322, Jan. 2000.

(Continued)

Primary Examiner — Alvin Zhu
(74) Attorney, Agent, or Firm — Kenyon & Kenyon LLP (57) ABSTRACT

A method of operating a mobile radio network for adjusting the counter states of the packet data units to be transmitted in the convergence protocol layer protocol units of network entities of the mobile radio network. User data is transmitted from a first network entity of the mobile radio network, in particular a mobile station, to a second network entity of the mobile radio network, in particular a higher-level network unit, the user data is combined prior to transmission into at least one packet data unit in a first convergence protocol layer protocol unit of the first network entity; and the at least one packet data unit is transmitted from a first radio link control layer protocol unit of the first network entity to a second radio link control layer protocol unit of the second network entity. If the transmission of the at least one packet data unit fails, the first radio link control layer protocol unit transmits an error message to the first convergence protocol layer protocol unit after receiving a confirmation message confirming the failure from the second radio link control layer protocol unit.

4 Claims, 2 Drawing Sheets

OTHER PUBLICATIONS

3GPP: "3$^{rd}$ Generation Partnership Project; Technical Specification Group Radio Access Network; Radio Interface Protocol Architecture" (3G TS 25.301, version 3.30), 3G S 25.301, Dec. 1999.

ETSI: "Universal Mobile Telecommunication System (UMTS); MAC Protocol Specification", ETSI TS 125.323, Jan. 2000.

ETSI: "Universal Mobile Telecommunication System (UMTS); Packet Data Convergence Protocol (PDCP) Specification", (3G TS 25.323, version 3.1.0, Release 1999), ETSI TS 125.323, Mar. 2000.

3G TS 25.322 Draft V3.1.0 (Dec. 1999)—"3rd Generation Partnership Project; Technical Specification Group Radio Access Network; RLC Protocol Specification (3G TS 25.322 DRAFT version 3.1.0)."

ETSI TS 125 323 V3.90.0 (20000-01)—"Universal Mobile Telecommunications System (UMTS); Mac protocol specification (3G TS 25.323 version 3.0.0 Release 1999)."

International Search Report of Application No. PCT/DE01/00536 dated Jun. 28, 2001.

ETSI: "Universal Mobile Telecommunications System (UMTS); Radio Interface Protocol Architecture, (3G TS 25.301 version 3.3.0 Release 1999)" ETSI TS 125 301 v3.3.0, Jan. 2000, pp. 1-48.

TR45: Data Service Options for Wideband Spread Spectrum Systems: Packet Data Services, published version Feb. 1998.

* cited by examiner

METHOD OF OPERATING A MOBILE RADIO NETWORK

CROSS-REFERENCE TO RELATED APPLICATION

The present application is a continuation of U.S. patent application Ser. No. 10/204,114 filed on Oct. 29, 2002, now U.S. Pat. No. 7,466,708 which was a national phase application based on international application PCT/DE01/00536 filed on Feb. 13, 2001 and claimed priority to German Application DE 100 08 148.7 filed on Feb. 22, 2000.

FIELD OF THE INVENTION

The present invention relates to a method of operating a mobile radio network.

BACKGROUND INFORMATION

A method is discussed in the publication entitled "TS 25.323 Packet Data Convergence Protocol Specification," in which user data is transmitted between a mobile station and a network unit, the user data is combined prior to transmission into packet data units in a convergence protocol layer known as the PDCP (Packet Data Convergence Protocol) layer according to the UMTS (Universal Mobile Telecommunication System) standard, a first PDCP protocol unit in the mobile station and a second PDCP protocol unit in the network unit establishing a first logical connection.

To transmit packet data units, the sent packet data units are each numbered with a PDCP send sequence number and stored in both the mobile station and the network unit by the respective PDCP protocol unit, and the received packet data units are each counted using a PDCP receive sequence number.

Below the convergence protocol layer is a radio link control layer that is known as the RLC layer according to the UMTS standard and is also present in both the mobile station and the network unit, a first RLC protocol unit in the mobile station and a second RLC protocol unit in the network unit establishing a second logical connection.

A packet data unit is transmitted, for example, from the mobile station to the network unit by first transferring the packet data unit from the first PDCP protocol unit to the next lower first RLC protocol unit. According to the method discussed in the publication entitled "TS 25.322 Radio Link Control Specification," the packet data units received by higher layers are numbered with an RLC send sequence number that is unique to the first RLC protocol unit and stored in the first RLC protocol unit. The RLC send sequence number is appended to the packet data unit, and the packet data unit is subsequently transmitted to the second RLC protocol unit via the second logical connection by forwarding the packet data unit from the first RLC protocol unit to lower layers, which are not relevant for the present invention, and finally transmitting them via the air interface so that they are then passed up through the layers to the second RLC protocol layer.

If the packet data unit becomes damaged during transmission from the first RLC protocol unit to the second protocol unit, the second RLC protocol unit notifies the first RLC protocol unit of the failed transmission by sending an RLC status message in which the RLC send sequence number belonging to the packet data unit is identified as having been transmitted with errors, whereupon the first RLC protocol unit retransmits the corresponding packet data unit after receiving the RLC status message.

If the packet data unit is received error-free by the second RLC protocol unit, the latter forwards the packet data unit to the next higher PDCP protocol unit and returns to the first RLC protocol unit an RLC status message in which the RLC send sequence number belonging to the packet data unit is identified as having been transmitted error-free, whereupon the first RLC protocol unit deletes the packet data unit from its memory and notifies the next-higher first PDCP protocol unit that the packet data unit was transmitted error-free, whereupon this first PDCP protocol unit also deletes the packet data unit from its memory.

The transmission of a single RLC status message for each error-free or faulty packet data unit received by the second RLC unit is discussed here by manner of example. The publication entitled "TS 25.322 Radio Link Control Specification" also discusses a number of other methods for sending and confirming received messages by the RLC protocol units.

While a logical connection is being set up or reconfigured between the first and the second RLC protocol units, a parameter for both RLC protocol units is set, specifying a period in time in which error-free transmission of a packet data unit between the RLC protocol units must be completed or the maximum number of transmission attempts by the first RLC protocol unit for a single packet data unit.

If a period of time has been specified, a timer is started the first time a packet data unit is transmitted by a first RLC protocol unit and ends only upon receipt of an RLC status message confirming the error-free transmission of this packet data unit. If the time measurement exceeds the specified period of time, no additional attempt to transmit the packet data unit is started, and the packet data unit is deleted from the memory of the first RLC protocol unit.

If a maximum number of transmission attempts was specified when setting up or reconfiguring the second logical connection, a counter having the initial value zero is started the first time a packet data unit is transmitted by the first RLC protocol unit and incremented by one each time another transmission attempt is made. If the counter is equal to the maximum number of transmission attempts, no further attempt to transmit the packet data unit is started, and the packet data unit is deleted from the memory of the first RLC protocol unit.

To notify the second RLC protocol unit that no further transmission attempts will be made and that the second RLC protocol unit should stop waiting for the corresponding packet data unit, the first RLC protocol unit sends the second RLC protocol unit an RLC discard message containing the RLC send sequence number that specifies the next packet data unit in the sequence of transmitted packet data units, for which—if any further transmitted packet data units occur in the meantime—the first RLC protocol unit has up to this point received no RLC status message confirming error-free transmission from the second RLC protocol unit.

If, upon receiving the RLC discard message, the second RLC protocol unit expects the next packet data unit in the correct sequence to have a lower RLC send sequence number than the number specified in the RLC discard message, the second RLC protocol unit adjusts the value of the RLC send sequence number it expects next to the RLC send sequence number received in the RLC discard message and no longer expects to receive any packet data units having RLC send sequence numbers lower than the number specified in the RLC discard message. The RLC send sequence number of what is now the next packet data unit expected in the correct sequence is then returned to the first RLC protocol unit in a confirmation message (RLC discard confirm).

If, contrary to the assumption of the first RLC protocol unit, a packet data unit has nevertheless been received error-free by the second RLC protocol unit (this may happen, for example, if the RLC status message that was supposed to confirm the error-free receipt of the packet data unit gets lost), the second RLC protocol unit expects, upon receiving the RLC discard message, a subsequent packet data unit in the correct sequence having the same or a higher RLC send sequence number than the number specified in the RLC discard message. In this case, an adjustment by the second RLC protocol unit is not necessary, and an RLC status message is subsequently returned to the first RLC protocol unit identifying the RLC send sequence numbers belonging to the error-free transmitted packet data units as having been transmitted error-free.

SUMMARY OF THE INVENTION

The exemplary method of operating a mobile radio network according to the present invention provides that, if the transmission of the at least one packet data unit fails, the first radio link control layer protocol unit transmits an error message to the first convergence protocol layer protocol unit after receiving a confirmation message confirming the failure from the second radio link control layer protocol unit. In this manner, the first convergence protocol layer protocol unit may be notified by the first next lower radio link control layer protocol unit in the event that a packet data unit was unable to be successfully transmitted to the second radio link control layer protocol unit by the first radio link control layer protocol unit, for example, within a period of time specified when setting up or reconfiguring the logical connection between the first and a second radio link control layer protocol unit or after a maximum number of transmission attempts were made for the at least one packet data unit. A counter for counting the transmitted packet data units is thus adjustable to the number of successfully transmitted packet data units in the first convergence protocol layer protocol unit. Unsuccessfully transmitted packet data units that are no longer to be transmitted, particularly in the event of a repeatedly unsuccessful transmission, are also deletable from a memory of the first convergence protocol layer protocol unit on the basis of this notification, preventing them from unnecessarily taking up memory space in the first convergence protocol layer protocol unit.

This notification occurs only after the first radio link control layer protocol unit has received the confirmation message, enabling the first radio link control layer protocol unit to determine on the basis of the confirmation message whether the at least one packet data unit was indeed received with errors by the second radio link control layer protocol unit and thus also that the status of the counter in the first convergence protocol layer protocol unit must indeed be adjusted.

The failed transmission of multiple packet data units and their numbers may be communicated by the confirmation message of the first radio link control layer protocol unit, and for the first convergence protocol layer protocol unit to receive these numbers from the first radio link control layer protocol unit, so that the packet data units assigned to these numbers are deleted from the memory of the first convergence protocol layer protocol unit, the counter is decremented by the number of untransmitted packet data units, and a new packet data unit to be transmitted is numbered as a function of the counter status thus decremented. In this manner, the first radio link control layer protocol unit may let the first convergence protocol layer protocol unit know which packet data units were indeed unable to be transmitted and enable the first convergence protocol layer protocol unit to thereby correctly adjust the counter status and correctly delete the unsuccessfully transmitted packet data units from its memory.

Transmitting the numbers of multiple unsuccessfully transmitted packet data units in the confirmation message also eliminates the need to transmit a separate confirmation message for each unsuccessfully transmitted packet data unit, thus saving transmission resources, i.e., transmission bandwidth.

However, the failed transmission of a single packet data unit may be communicated by the confirmation message of the first radio link control layer protocol unit, and for the first radio link control layer protocol unit to transmit the number of the packet data unit intended for deletion by the first radio link control layer protocol unit to the first convergence protocol layer protocol unit on the basis of this notification, so that the packet data unit assigned to this number is deleted from the memory of the first convergence protocol layer protocol unit, the counter is decremented by one, and a new packet data unit to be transmitted is numbered as a function of the counter status thus decremented. This eliminates the need to transmit additional information via the air interface, since the first radio link control layer protocol unit is able to determine whether the packet data unit was indeed received with errors by the second radio link control layer protocol unit solely on the basis of having received the confirmation message itself, i.e., without evaluating its contents or a number of an unsuccessfully transmitted packet data unit contained therein. The number of the unsuccessfully transmitted packet data unit thus no longer even has to be transmitted to the first radio link control layer protocol unit together with the confirmation message, also this saves bandwidth for transmitting the confirmation message.

At least one packet data unit stored in the memory of the first convergence protocol layer protocol unit and transmitted prior to receiving the notification of the failed transmission is assigned a new number as a function of the decremented counter status upon receipt of this notification. This ensures that all packet data units still to be stored in the first convergence protocol layer protocol unit receive updated numbers for optional retransmission.

One exemplary embodiment of the present invention is illustrated in the drawings and explained in the following description.

DETAILED DESCRIPTION

Figure 1:
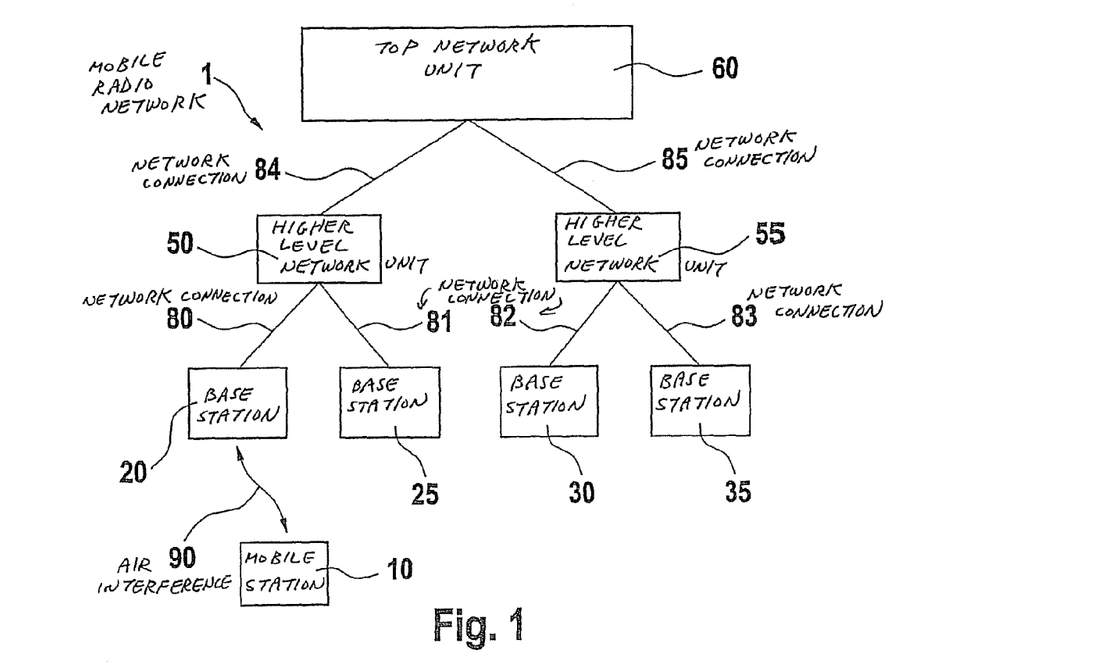
FIG. 1 shows a block diagram of a mobile radio network.

In FIG. 1, 10 identifies a first network entity configured as a mobile station in a mobile radio network 1, mobile station 10 is configured, for example, as a mobile telecommunications terminal. Mobile station 10 is connected to a first base station 20 of mobile radio network 1 via an air interface 90. First base station 20 is connected via a first fixed network connection 80 to a first higher-level network unit 50 that represents a second network entity. A second base station 25 is also connected to first higher-level network unit 50 via a second fixed network connection 81. A third base station 30 is connected to a second higher-level network unit 55 via a third fixed network connection 82. A fourth base station 35 is connected to second higher-level network unit 55 via a fourth fixed network connection 83. First higher-level network unit 50 is connected to a top network unit 60 via a fifth fixed network connection 84, and second higher-level network unit 55 is connected to top network unit 60 via a sixth fixed network connection 85.

Both higher-level network units 50, 55 form "Radio Network Subsystems" (RNS) according to the UMTS standard. Top network unit 60 forms a General Packet Radio System Support Node (GSN) according to the UMTS standard.

Logical connections are set up in cellular mobile radio network 1 to transmit data between mobile station 10 and the other units of mobile radio network 1 participating in the established connection. Different types of logical connections exist simultaneously between mobile station 10 and the different participating units of a mobile radio network 1. These logical connections derive from a hierarchical model in which each hierarchical layer corresponds to a protocol that is present in both mobile station 10 and the corresponding unit of mobile radio network 1 and that establishes the corresponding logical connection.

Figure 2:
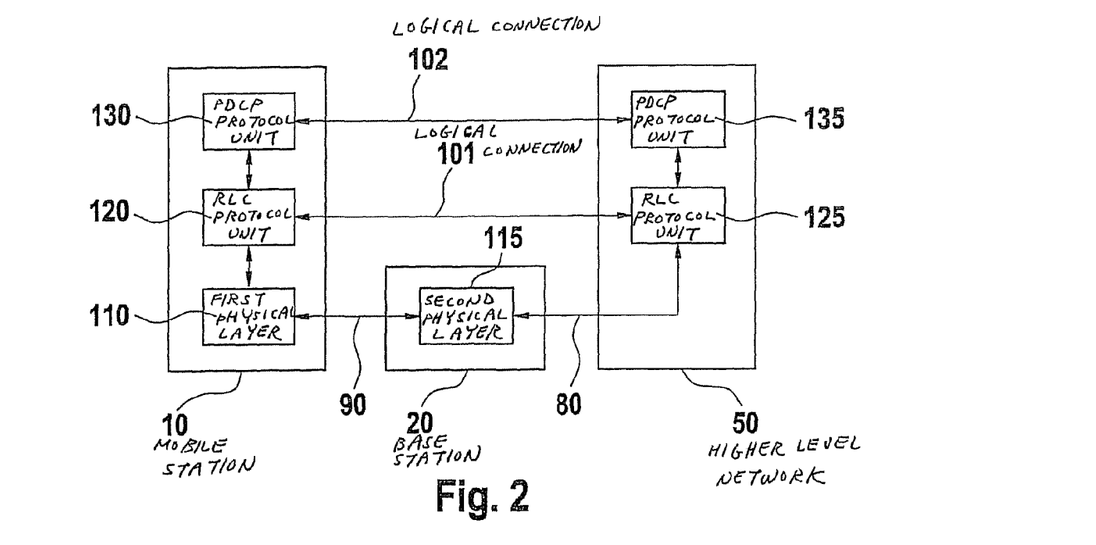
FIG. 2 shows a block diagram of the transmission of packet data units between two different network entities.

According to FIG. 2, the logical connections are shown by manner of example between mobile station 10 and first higher-level network unit 50 as well as between mobile station 10 and first base station 20. The lowest hierarchical layer in this hierarchical model is formed by a first physical layer 110 in mobile telecommunications unit 10 and a second physical layer 115 in first base station 20, creating a physical connection corresponding to air interface 90 between mobile station 10 and first base station 20 of mobile radio network 1. Above it is a data protection layer, which is also called the "data link layer" according to the UMTS standard and is divided into multiple sublayers and establishes different logical connections between mobile station 10 and first higher-level network unit 50, which is known as the RNC (radio network controller) according to the UMTS standard. A sublayer of this type, according to the UMTS standard, is the radio link control (RLC) layer, in which a first radio link control layer protocol unit 120, configured as an RLC protocol unit, in mobile station 10, and a second radio link control layer protocol unit 125, configured as an RLC protocol unit, in higher-level network unit 50, establish a second logical connection 101. Another sublayer directly above the RLC layer is the packet data convergence protocol layer, which is known according to the UMTS standard as the PDCP layer and in which a first convergence protocol layer protocol unit 130, configured as a PDCP protocol unit, in mobile station 10, and a second convergence protocol layer protocol unit 135, configured as a PDCP protocol unit, in first higher-level network unit 50, establish a first logical connection 102. In the higher hierarchical layers, for example the network and transport layer, additional protocols, for example the radio resource control (RRC) protocol, the Internet protocol (IP), the transit control protocol (TCP) and the like, are able to set up additional logical connections. According to FIG. 2, adjacent layers are interconnected in the hierarchical model, higher-level layers using the services of corresponding adjacent lower-level layers. As indicated in FIG. 1, second physical layer 115 is connected via first fixed network connection 80 to higher-level network unit 50, where it is connected to second RLC protocol unit 125.

The corresponding UMTS protocol architecture of what are called layers 2 and 3, to which the packet data convergence protocol layer also belongs, is discussed in the publication entitled "Technical Specification 25.301, UMTS Radio Interface Protocol Architecture." In particular, the packet data convergence protocol layer and its position within this architecture are known. PDCP protocol units 130, 135 are discussed in the publication entitled "Technical Specification 25.323, Packet Data Convergence Protocol" to the extent that is has previously been specified.

One function of PDCP protocol units 130, 135 is to compress packet data check information appended by the protocols of the transport and network layer located above the packet data convergence protocol layer to the user data combined into a data unit or packet data unit, also in the packet data convergence protocol layer, prior to being transmitted and belonging to an application that is also running above the packet data convergence protocol layer, the information requiring compression prior to being transmitted via air interface 90 to ensure efficient transmission.

For reasons relating to the compression of packet data check information and a change from a connection between mobile station 10 and first base station 20 to a connection between mobile station 10 and a base station connected to a higher level network unit other than first higher-level network unit 50, for example third base station 30, the transmitted packet data units are each numbered and stored with a PDCP send sequence number in mobile station 10 as well as in first higher-level network unit 50 by PDCP protocol units 130, 135 connected via first logical connection 102. The received packet data units are each counted for the same reasons in both mobile unit 10 and first higher-level network unit 50 by logically interconnected PDCP protocol units 130, 135 using a PDCP receive sequence number. Because both mobile station 10 and first higher-level network unit 50 are able to send and receive packet data units, both the received and the transmitted packet data units must be counted in each PDCP protocol unit 130, 135. The PDCP send sequence numbers and PDCP receive sequence numbers therefore exist in both the uplink (UL), i.e., in the link from mobile station 10 to first higher-level network unit 50, and in the downlink (DL), i.e., in the link from first higher-level network unit 50 to mobile station 10. Mobile station 10 thus counts the transmitted packet data units having the PDCP-UL send sequence number (PDCP-UL-SSN) and the received packet data units having the PDCP-DL receive sequence number (PDCP-DL-RSN), while first higher-level network unit 50 counts the transmitted packet data units having the PDCP-DL send sequence number (PDCP-DL-SSN) and the received packet data units having the PDCP-UL receive sequence number (PDCP-UL-RSN).

To allow RLC protocol units 120, 125, which send packet data units to each other via second logical connection 101, to let the other RLC protocol unit know which packet data unit or packet data units was/were transmitted with errors and which packet data unit or packet data units was/were transmitted error-free, each of the RLC protocol units assigns an RLC send sequence number to the packet data units to be transmitted. The packet data units transmitted in the uplink (UL) from mobile station 10 to first higher-level network unit 50 are therefore numbered with the RLC-UL send sequence number (RLC-UL-SSN), and the packet data units transmitted in the downlink (DL) from first higher-level network unit 50 to mobile unit 10 are assigned the RLC-DL send sequence number (RLC-DL-SSN). These send sequence numbers are then appended to the packet data unit prior to transmission. The RLC send sequence numbers may differ from the PDCP send sequence numbers on the basis of a segmentation performed in first RLC protocol unit 120, in which a packet data unit received by next higher first PDCP protocol unit 130 is divided into multiple packet data units.

In addition, each RLC protocol unit 120, 125 contains a parameter or counter which is known as VR(R) in the UMTS standard and specifies, i.e., counts, the RLC send sequence number of the next packet data unit expected in the correct sequence—that is, all packet data units having RLC send sequence numbers lower than the number specified in parameter VR(R) have already been received error-free. The VR(R) parameter in first RLC protocol unit 120 thus specifies the RLC-DL send sequence number of the next packet data unit expected in the correct sequence by first higher-level network unit 50 and, for the sake of clarity, is hereafter referred to as DL-VR(R) in this exemplary embodiment. Parameter VR(R) in second RLC protocol unit 125 specifies the RLC-UL send sequence number of the next packet data unit expected in the correct sequence by mobile station 10 and, for the sake of clarity, is hereafter referred to as UL-VR(R) in this exemplary embodiment.

The present invention assumes the concrete and exemplary scenario that mobile station 10 is connected to units of mobile radio network 1, such as first base station 20, first higher-level network unit 50 and top network unit 60, via the necessary physical and logical connections, in particular first logical PDCP connection 102 established by first PDCP protocol unit 130 and second PDCP protocol unit 135 between mobile unit 10 and first higher-level network unit 50, and a data transfer, i.e., an exchange of packet data units, occurs via this connection. In this exemplary embodiment, the method is described by manner of example based on the transmission of packet data units from mobile station 10 to first higher-level network unit 50. However, the method is equally valid for the transmission of packet data units from first higher-level network unit 50 to mobile station 10.

Because the method is described below on the basis of uplink data transmission, parameters DL-VR(R), RLC-DL-SSN, PDCP-DL-SSN, and PDCP-DL-RSN are of no interest to the rest of the exemplary embodiment. It is also assumed by manner of example that first RLC protocol unit 120 does not segment the packet data units received from first PDCP protocol unit 130. A packet data unit that was transferred from first PDCP protocol unit 130 to first RLC protocol unit 120 is thus also sent as a packet data unit to second RLC protocol unit 125. It is also assumed by manner of example that a maximum number of 3 transmission attempts was defined when setting up second logical connection 101 between RLC protocol units 120 and 125.

Figure 3:
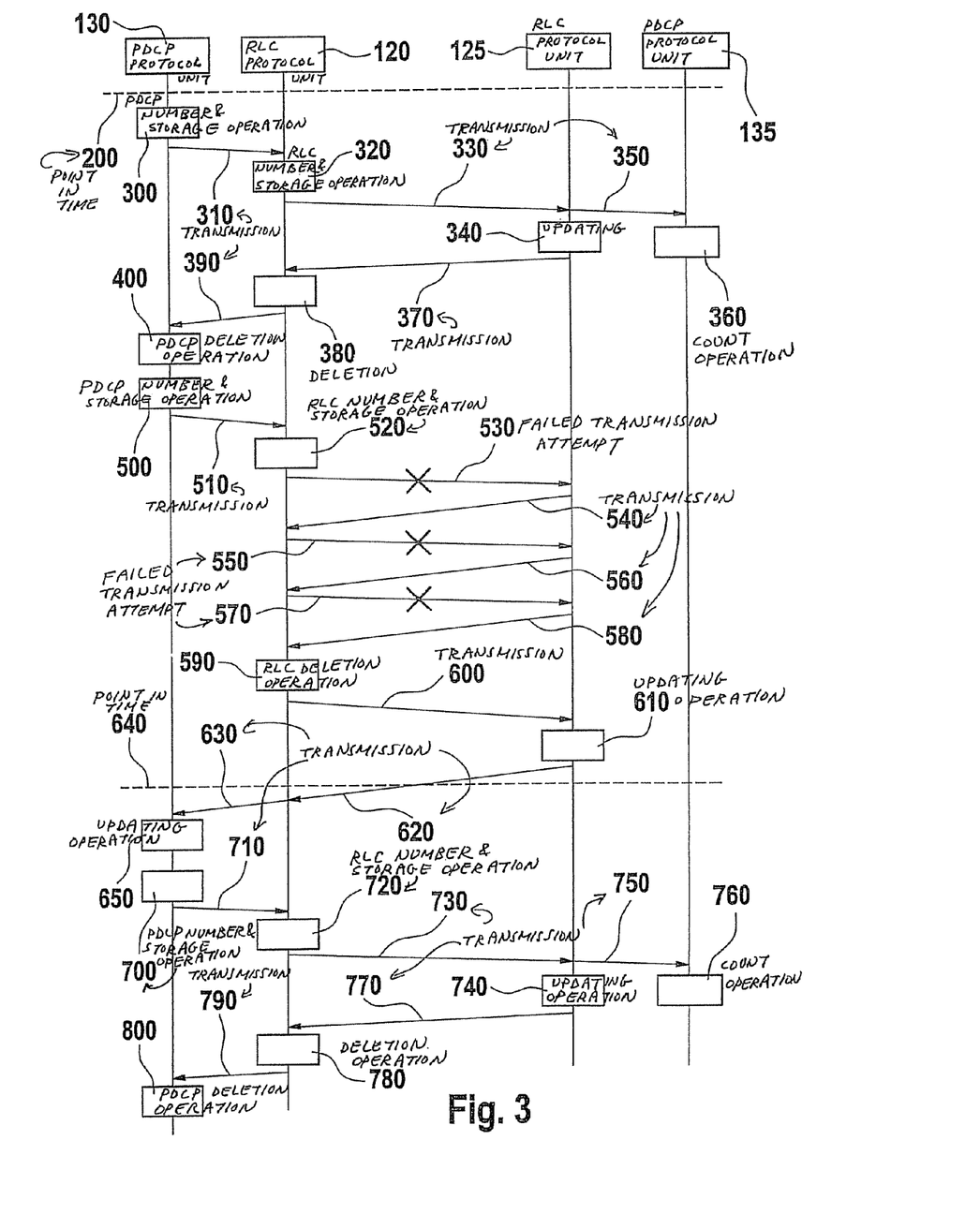
FIG. 3 shows a flow chart for the exemplary method according to the present invention.

At a point in time 200, which is identified in FIG. 3 by a broken line, it is also assumed by manner of example that the PDCP-UL send sequence number in first PDCP protocol unit 130 is equal to the PDCP-UL receive sequence number in second PDCP protocol unit 135, and has the value PDCP-UL-SSN=PDCP-UL-RSN=10. It is further assumed by manner of example that the RLC-UL send sequence number has the value RLC-UL-SSN=10, and parameter UL-VR(R) has the value UL-VR(R)=11, which means that second RLC protocol unit 125 has received the packet data units having UL-RLC send sequence numbers 1 through 10 and expects the next packet data unit in the sequence to be assigned RLC-UL send sequence number RLC-UL-SSN=11. First PDCP protocol unit 130 receives user data from higher layers, converts it to a packet data unit and performs a PDCP numbering and storage operation 300 in which the packet data unit is numbered and stored with PDCP-UL send sequence number PDCP-UL-SSN=11. After optional compression of the packet data unit, the latter is transmitted in a transmission step 310 to first RLC protocol unit 120, which performs an RLC numbering and storage operation 320 in which the packet data unit is numbered and stored with RLC-UL send sequence number RLC-UL-SSN=11. After the RLC-UL send sequence number has been appended to the packet data unit, the packet data unit is transmitted in a further transmission step 330 to second RLC protocol unit 125, which derives the RLC-UL send sequence number from the packet data unit. Because the derived RLC-UL send sequence number corresponds to the next RLC-UL send sequence number expected in the correct sequence and recorded in parameter UL-VR(R) (RLC-UL-SSN=UL-VR(R)), second RLC protocol unit 125 performs an updating operation 340 of parameter UL-VR(R), setting it to the value 12, i.e., the packet data unit having RLC-UL send sequence number 12 is expected as the next packet data unit in the correct sequence. In a transmission step 350, the packet data unit is then transferred to second PDCP protocol unit 135, which subsequently initiates count operation 360 in which PDCP-UL receive sequence number is incremented by one, yielding the value PDCP-UL-RSN=11. The PDCP-UL send sequence number and the PDCP-UL receive sequence number with which the packet data unit was numbered in first and second PDCP protocol units 130, 135 are thus identical.

In a further transmission operation 370, second RLC protocol unit 125 subsequently notifies first RLC protocol unit 120 in an RLC status message that the packet data unit having RLC-UL send sequence number RLC-UL-SSN=11 was received error-free. First RLC protocol unit 120 subsequently deletes the packet data unit from its memory in a deletion operation 380 and notifies first PDCP protocol unit 130 in a transmission operation 390 that the packet data unit was transmitted successfully, whereupon first PDCP protocol unit 130 also deletes the stored packet data unit from its memory during a PDCP deletion operation 400.

In the following description, it is assumed by manner of example that higher layers transfer additional user data to first PDCP protocol unit 130, which converts the data to a packet data unit and numbers and stores the latter with PDCP-UL send sequence number PDCP-UL-SSN=12 in a PDCP numbering and storage operation 500. After optional compression of the packet data unit, the latter is transferred in a transmission operation 510 to first RLC protocol unit 120, where it is numbered and stored with RLC-UL send sequence number RLC-UL-SSN=12 in an RLC numbering and storage operation 520. The RLC-UL send sequence number is then appended to the packet data unit. It is now further assumed that transmission attempt 530 fails, and the packet data unit was not transmitted error-free to second RLC protocol unit 125. In an RLC status message transmitted in transmission operation 540, second RLC protocol unit 125 notifies first RLC protocol unit 120 that the transmission of the packet data unit having RLC-UL send sequence number RLC-UL-SSN=12 failed. Because the maximum allowed number of transmission attempts has not yet been reached, first RLC protocol unit 120 starts another transmission attempt 550 in which the packet data unit is retransmitted to second RLC protocol unit 125. However, it is assumed that second RLC protocol unit 125 was again unable to receive the packet data unit without errors, causing a transmission operation 560 corresponding to transmission operation 540 to occur. A third transmission attempt 570 by first RLC protocol unit 120 also fails, which is communicated to first RLC protocol unit 120 by second RLC protocol unit 125 in transmission operation 580. Because a maximum number of 3 transmission attempts was specified when setting up second logical connection 101, a new attempt to retransmit the packet data unit having RLC-UL send sequence number RLC-UL-SSN=12 is not started. Instead, the packet data unit is deleted from the memory of first RLC protocol unit 120 in an RLC deletion operation 590, and an RLC discard message is sent to second RLC protocol unit 125 in a transmission operation 600, the RLC discard message containing the RLC-UL send sequence number of the next as yet unconfirmed packet data unit in the sequence of the transmitted packet data units. In this case, this is RLC-UL send sequence number RLC-UL-SSN=13, which belongs to a next, as yet untransmitted, packet data unit. Because the RLC-UL send sequence number specified in the RLC discard message is higher than the RLC-UL send sequence number (UL-VR(R)) of the next packet data unit expected in the correct sequence by second RLC protocol unit 125, second RLC protocol unit 125 performs an updating operation 610 in which parameter UL-VR(R) is set to the RLC-UL send sequence number of the next packet data unit expected in the correct sequence. In this example, the RLC-UL send sequence number of the next packet data unit expected in the correct sequence is equal to 13, and parameter UL-VR(R) thus takes on value UL-VR(R)=13. To confirm that the packet data unit having the RLC-UL send sequence number was indeed unsuccessfully received by second RLC protocol unit 125, the latter returns an RLC discard confirm message to first RLC protocol unit 120 in a transmission operation 620, the RLC discard confirm message containing the updated value of parameter UL-VR(R), in this case, therefore, RLC-UL send sequence number RLC-UL-SSN=13. Based on the RLC discard confirm message, first RLC protocol unit 120 determines that the now deleted packet data unit having RLC-UL send sequence number RLC-UL-SSN=12 was in fact not transmittable error-free to second RLC protocol unit 125.

The following problems may arise in the method described up to this point:

According to the exemplary method described to this point, first PDCP protocol unit 130 has not determined that a packet data unit was unable to be transmitted from next lower first RLC protocol unit 120 to second RLC protocol unit 125, and thus also to second PDCP protocol unit 135. Although the PDCP-UL send sequence number was assigned to this packet data unit by first PDCP protocol unit 130, second PDCP protocol unit 135 did not assign a PDCP-UL receive sequence number. In FIG. 3, the PDCP-UL send sequence number in PDCP protocol unit 130 and the PDCP-UL receive sequence number in PDCP protocol unit 135 are not identical at point in time 640, which is indicated by a broken line, and a subsequent packet data unit, which would be sent in first PDCP protocol unit 130 to second PDCP protocol unit 135, would be assigned a PDCP-UL send sequence number by first PDCP protocol unit 130 that would differ from the PDCP-UL receive sequence number assigned by second PDCP protocol unit 135 upon receipt of the next packet data unit.

According to the present invention, therefore, first PDCP protocol unit 130 receives a message from first RLC protocol unit 120 in a further transmission operation 630, indicating that the packet data unit having RLC-UL send sequence number RLC-UL-SSN=12 was unable to be transmitted, the message containing an identifier MUI (Message Unit Identifier) that identifies the packet data unit within first PDCP protocol unit 130 and is known to first RLC protocol unit 120. In the event that the faulty transmission of always only one packet data unit is signaled, i.e., confirmed, by an RLC discard message and its confirmation message, the RLC discard confirm message, first RLC protocol unit 120 determines, on the basis of the type of this confirmation message, whether a packet data unit was indeed unable to be transmitted error-free. A received RLC discard confirm message is thus confirmation of a failed transmission, and an RLC status message is notification of the fact that a packet was in fact correctly received by second RLC protocol unit 125. Parameter UL-VR (R) contained in the RLC discard confirm message additionally indicates which RLC-UL send sequence number is expected by second RLC protocol unit 125 as the RLC-UL send sequence number assigned to the next packet data unit expected in the correct sequence, and that all packet data units having RLC-UL send sequence numbers lower than the number specified in parameter UL-VR(R) and stored in first RLC protocol unit 120 are deletable from the memory of first RLC protocol unit 120, and the corresponding packet data units are thus also deletable from the memory of first PDCP protocol unit 130. According to this exemplary method, first PDCP protocol unit 130 receives, during transmission operation 630, the information needed for updating operation 650 to delete the packet data units specified by the identifiers (MUI) from its memory and to reduce the PDCP-UL send sequence numbers of the packet data units remaining in the memory by one. In this case, therefore, the next PDCP-UL send sequence number to be assigned is again PDCP-UL-SSN=12, which is assigned to the next packet data unit to be sent. Correspondingly, a counter in first PDCP protocol unit 130 is thus reset by one to this value of PDCP-UL-SSN=12. If first PDCP protocol unit 130 had sent additional packet data units after the untransmittable packet data unit, the PDCP-UL send sequence numbers of these additional packet data units would also have to be updated, in this case reduced by one.

If further data is then transferred from higher layers to first PDCP protocol unit 130, the latter converts the data back to packet data units and performs a PDCP numbering and storage operation 700 in which the packet data unit is assigned PDCP-UL send sequence number PDCP-UL-SSN=12, according to the status of the counter in first PDCP protocol unit 130, and stored. If necessary, the packet data unit is then compressed and transferred to first RLC protocol unit 120 directly beneath first PDCP protocol unit 130 in a transmission operation 710. RLC protocol unit 120, in turn, performs an RLC storage and numbering operation 720 in which the packet data unit is assigned an RLC-UL send sequence number RLC-UL-SSN=13, and the packet data unit is stored. The RLC-UL send sequence number is subsequently appended to the packet data unit, which is then sent to second RLC protocol unit 125 in a transmission operation 730. The second RLC protocol unit derives the RLC-UL send sequence number from the packet data unit. Because the derived RLC-UL send sequence number is identical to the next RLC-UL send sequence number recorded in parameter UL-VR(R) and expected in the correct sequence, second RLC protocol unit 125 performs an updating operation 740 of parameter UL-VR (R), which is then set to 14. In a transmission step 750, the packet data unit is subsequently sent to second PDCP protocol unit 135, which then initiates count operation 760, in which the PDCP-UL receive sequence number is incremented by one, yielding the value PDCP-UL-RSN=12. The PDCP-UL send sequence number and the PDCP-UL receive sequence number with which the packet data unit was numbered are thus both identical again even though a packet data unit was unable to be transmitted. In a further transmission operation 770, second RLC protocol unit 125 subsequently sends an RLC status message to first RLC protocol unit 120, indicating that the packet data unit having RLC-UL send sequence number RLC-UL-SSN=13 was received error-free. First RLC protocol unit 120 subsequently deletes the packet data unit from its memory in a deletion operation 780 and notifies first PDCP protocol unit 130 in a transmission operation 790 of the successful packet data unit transmission, whereupon first PDCP protocol unit 130 also deletes the stored packet data unit from its own memory in a PDCP deletion operation 800.

In another exemplary embodiment, multiple RLC discard messages from first RLC protocol unit 120 may be collected in second RLC protocol unit 125 and an RLC discard confirm message may be sent to first RLC protocol unit 120 by second RLC protocol unit 125, for example upon reaching a preset number or after a preset period of time. Also first RLC protocol unit 120 may notify second RLC protocol unit 125 of the deletion of multiple packet data units in an RLC discard message, for example by the RLC-UL send sequence number contained in the RLC discard message specifying the next packet data unit expected in the sequence after the deleted packet data units, and second RLC protocol unit 125 sending an RLC discard confirm message to first RLC protocol unit 120, this RLC discard confirm message including the RLC-UL send sequence numbers of the corresponding packet data units already deleted in first RLC protocol unit 120 and not received in second RLC protocol unit 125, thereby notifying first RLC protocol unit 120 that the transmission of the corresponding packet data units failed. First RLC protocol unit 120 then sends the PDCP-UL send sequence numbers assigned to the RLC-UL send sequence numbers received in the RLC discard confirm message to first PDCP protocol unit 130, so that the packet data units assigned to these PDCP-UL send sequence numbers are deleted from the memory of first PDCP protocol unit 130. The status of the counter in first PDCP protocol unit 130 is then reduced by the number of packet data units not received in second RLC protocol unit 125. A new packet data unit to be sent is subsequently numbered in first PDCP protocol unit 130 as a function of the counter status thus decremented. Were first PDCP protocol unit 130 to send additional packet data units after the untransmittable packet data units, the PDCP-UL send sequence numbers of these additional packet data units would also have to be updated and reduced by the number of unsuccessfully transmitted packet data units.

What is claimed is:

1. A method of operating a mobile radio network in which user data is transmitted from a first network entity to a second network entity of the mobile radio network, the method comprising:
 combining the user data into at least one packet data unit in a first convergence protocol layer protocol unit of the first network entity;
 transmitting the at least one packet data unit from a first radio link control layer protocol unit of the first network entity to a second radio link control layer protocol unit of the second network entity;
 transmitting an error message, if there is a transmission failure of the at least one packet data unit, by the first radio link control layer protocol unit to the first convergence protocol layer protocol unit after receiving a confirmation message confirming the transmission failure from the second radio link control layer protocol unit, wherein the error message to be transmitted is generated by the first radio link control layer protocol unit;
 receiving the confirmation message in the first radio link control layer protocol unit as a response to a deletion message sent by the first radio link control layer protocol unit to the second radio link control layer protocol unit, wherein the first radio link control layer protocol unit informs the second radio link control layer protocol unit, based on the deletion message, that the at least one packet data unit will be deleted when the confirmation message confirms the transmission failure; and
 in response to receiving the error message by the first convergence protocol layer protocol, deleting, at the first convergence protocol layer protocol unit, packet data units specified in the error message from a memory and reducing a number count of packet data units remaining in the memory by a number of the deleted packet data units;
 wherein the first network entity is a mobile station and the second network entity is a higher-level network unit.

2. The method of claim 1, further comprising:
 numbering in a sequential manner, in an order of their transmission, a plurality of packet data units to be transmitted by the first convergence protocol layer protocol unit to the second network entity;
 storing the plurality of packet data units in a memory of the first convergence protocol layer protocol unit; and
 setting a counter in the first convergence protocol layer protocol unit according to a number of one of the plurality of packet data units about to be transmitted.

3. A method of operating a mobile radio network in which user data is transmitted from a first network entity to a second network entity of the mobile radio network, the method comprising:
 combining the user data into at least one packet data unit in a first convergence protocol layer protocol unit of the first network entity;
 transmitting the at least one packet data unit from a first radio link control layer protocol unit of the first network entity to a second radio link control layer protocol unit of the second network entity;
 transmitting an error message, if there is a transmission failure of the at least one packet data unit, by the first radio link control layer protocol unit to the first convergence protocol layer protocol unit after receiving a confirmation message confirming the transmission failure from the second radio link control layer protocol unit, wherein the error message to be transmitted is generated by the first radio link control layer protocol unit;
 in response to receiving the error message by the first convergence protocol layer protocol, deleting, at the first convergence protocol layer protocol unit, packet data units specified in the error message from a memory and reducing a number count of packet data units remaining in the memory by a number of the deleted packet data units;
 numbering in a sequential manner, in an order of their transmission, a plurality of packet data units to be transmitted by the first convergence protocol layer protocol unit to the second network entity;
 storing the plurality of packet data units in a memory of the first convergence protocol layer protocol unit; and
 setting a counter in the first convergence protocol layer protocol unit according to a number of one of the plurality of packet data units about to be transmitted;
 wherein the first network entity is a mobile station and the second network entity is a higher-level network unit.

4. A method of operating a mobile radio network in which user data is transmitted from a first network entity to a second network entity of the mobile radio network, the method comprising:
 combining the user data into at least one packet data unit in a first convergence protocol layer protocol unit of the first network entity;
 transmitting the at least one packet data unit from a first radio link control layer protocol unit of the first network entity to a second radio link control layer protocol unit of the second network entity;
 transmitting an error message, if there is a transmission failure of the at least one packet data unit, by the first radio link control layer protocol unit to the first convergence protocol layer protocol unit after receiving a confirmation message confirming the transmission failure from the second radio link control layer protocol unit, wherein the error message to be transmitted is generated by the first radio link control layer protocol unit;

receiving the confirmation message in the first radio link control layer protocol unit as a response to a deletion message sent by the first radio link control layer protocol unit to the second radio link control layer protocol unit, wherein the first radio link control layer protocol unit informs the second radio link control layer protocol unit, based on the deletion message, that the at least one packet data unit will be deleted when the confirmation message confirms the transmission failure;

in response to receiving the error message by the first convergence protocol layer protocol, deleting, at the first convergence protocol layer protocol unit, packet data units specified in the error message from a memory and reducing a number count of packet data units remaining in the memory by a number of the deleted packet data units;

numbering in a sequential manner, in an order of their transmission, a plurality of packet data units to be transmitted by the first convergence protocol layer protocol unit to the second network entity;

storing the plurality of packet data units in a memory of the first convergence protocol layer protocol unit; and setting a counter in the first convergence protocol layer protocol unit according to a number of one of the plurality of packet data units about to be transmitted.

* * * * *